Aug. 12, 1969  W. E. LANHAM, JR  3,460,667
METHOD AND APPARATUS FOR TRANSFERRING BAKERY
PRODUCTS AND SIMILAR ARTICLES
Original Filed April 7, 1965  6 Sheets-Sheet 1

INVENTOR.
WILLIAM E. LANHAM, Jr.
BY
Curtis, Morris & Safford
ATTORNEYS

INVENTOR.
WILLIAM E. LANHAM, Jr.

Aug. 12, 1969 W. E. LANHAM, JR 3,460,667
METHOD AND APPARATUS FOR TRANSFERRING BAKERY
PRODUCTS AND SIMILAR ARTICLES
Original Filed April 7, 1965 6 Sheets-Sheet 3

INVENTOR.
WILLIAM E. LANHAM, JR.

BY
Curtis, Morris & Safford
ATTORNEYS

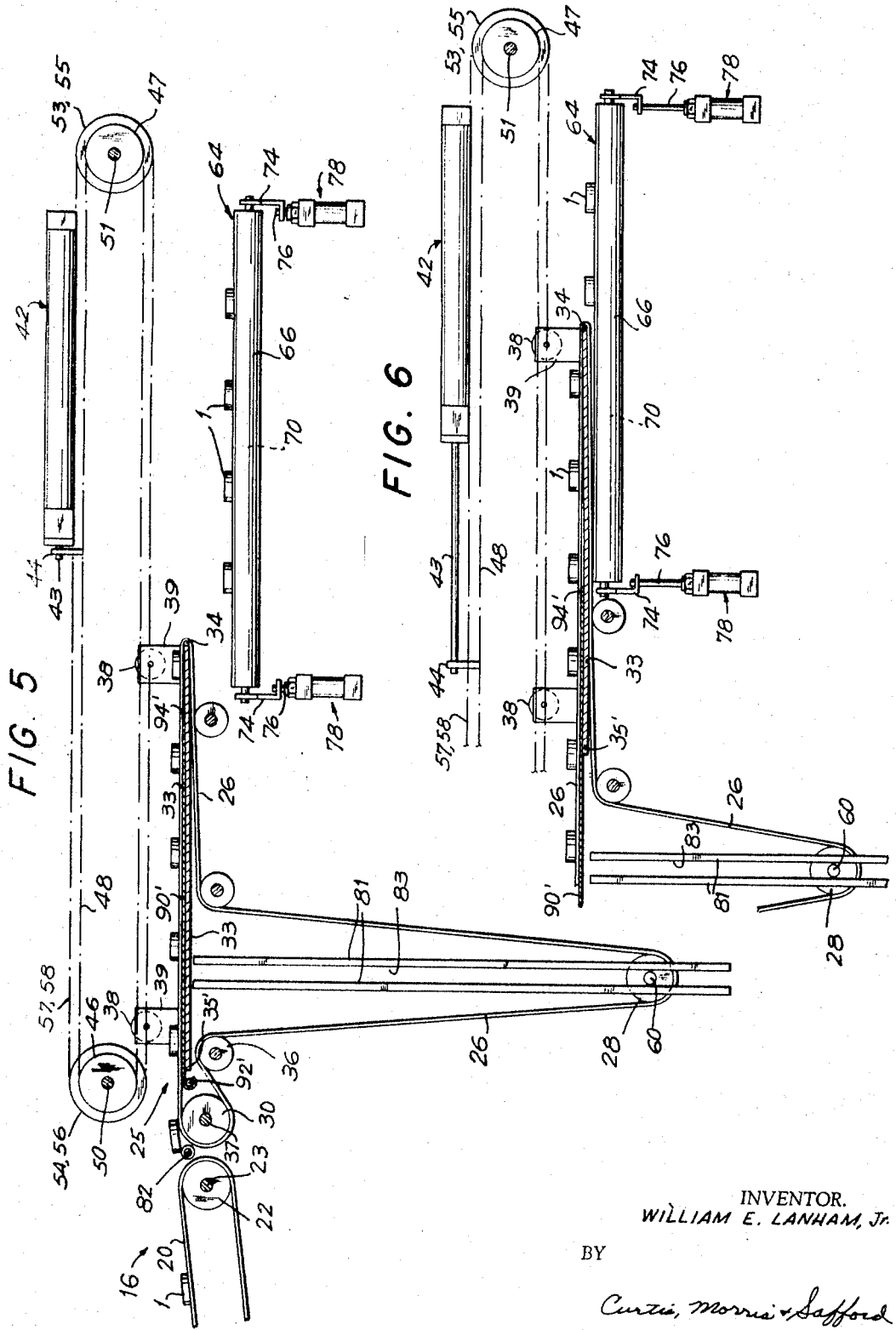

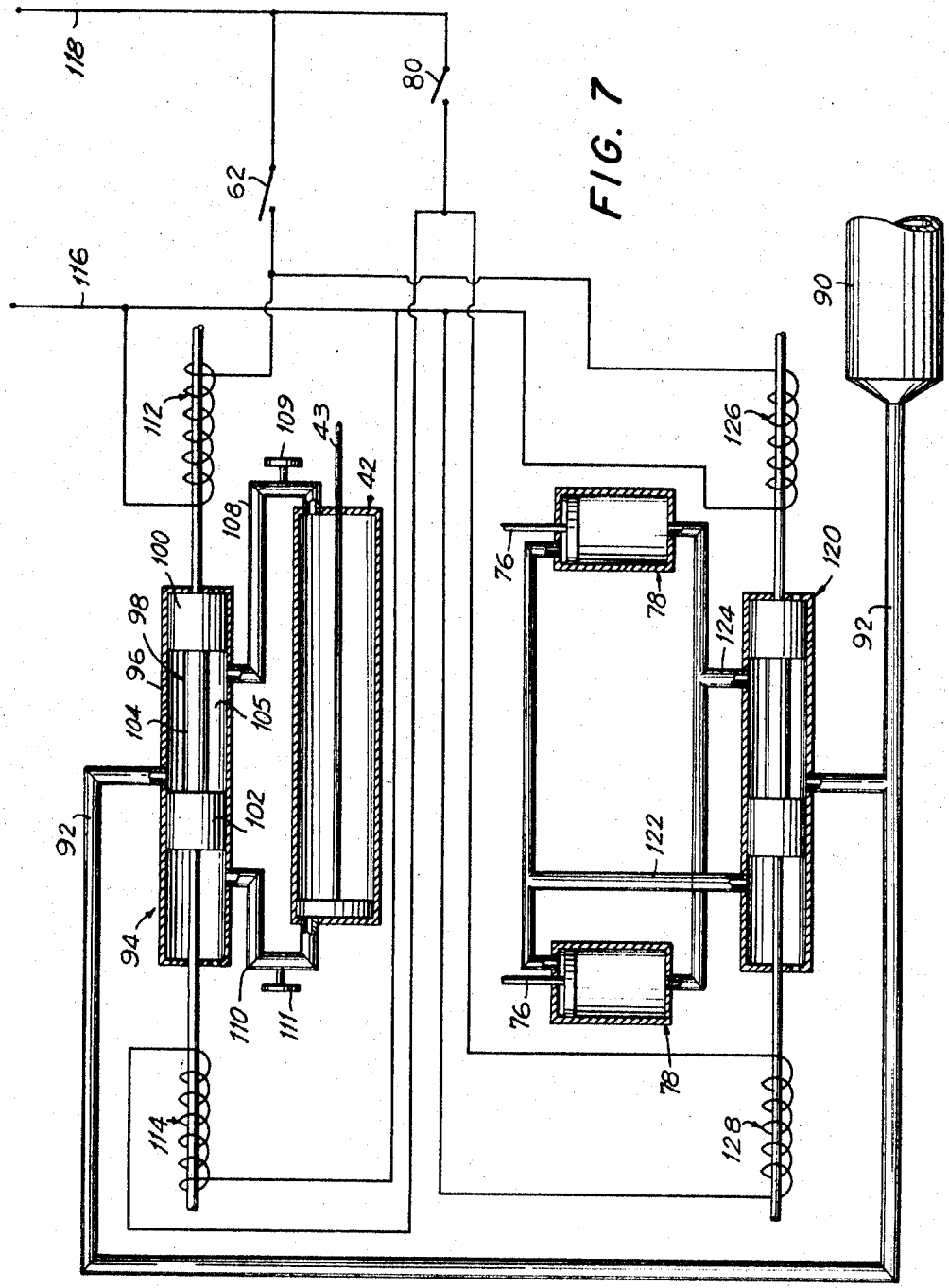

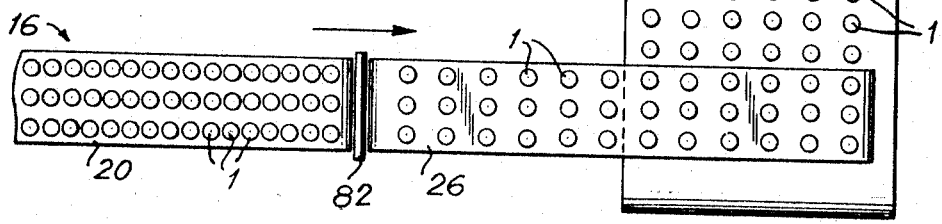
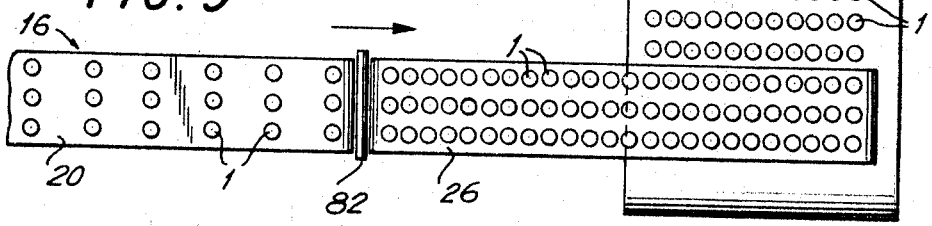
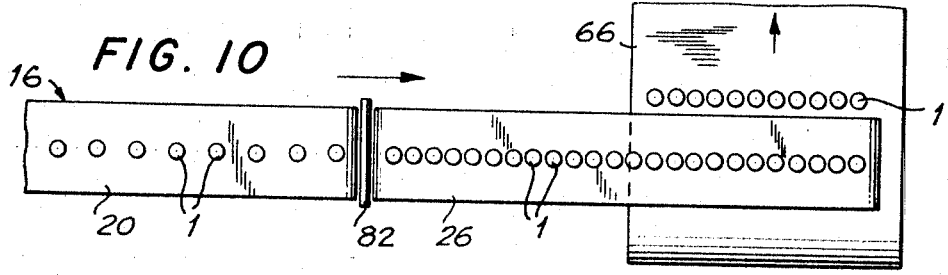
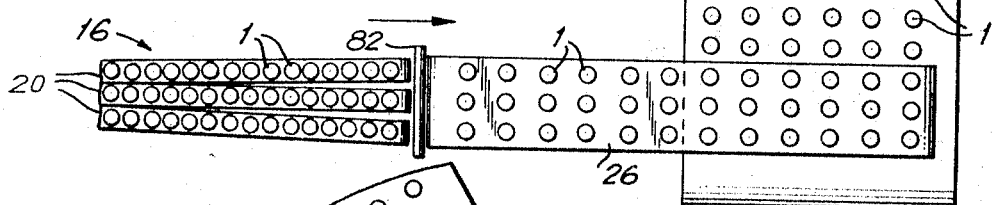
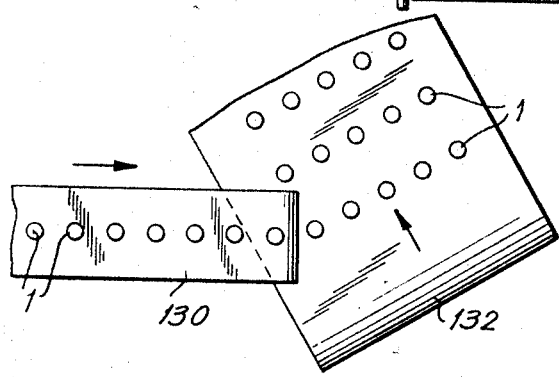
INVENTOR.
WILLIAM E. LANHAM, Jr.
BY
Curtis, Morris & Safford
ATTORNEYS United States Patent Office 3,460,667
Patented Aug. 12, 1969

3,460,667
METHOD AND APPARATUS FOR TRANSFERRING BAKERY PRODUCTS AND SIMILAR ARTICLES
William E. Lanham, Jr., Decatur, Ga., assignor to Lanham Machinery Company, Inc., Atlanta, Ga., a corporation of Georgia
Continuation of application Ser. No. 446,233, Apr. 7, 1965. This application Oct. 9, 1967, Ser. No. 674,384
Int. Cl. B65g 47/26, 17/00, 15/00
U.S. Cl. 198—30
9 Claims

ABSTRACT OF THE DISCLOSURE

A system is disclosed for arranging and positioning items such as unbaked bakery products for further processing. The products are received on a conveyor and are moved outwardly over a transfer zone upon an endless conveyor. The conveyor is then peeled back away from the products so that the products are deposited in upright position upon another endless conveyor or the like. The rate of movement outwardly over the transfer zone may be regulated to provide the desired spacing between the items, and the conveyor is then withdrawn at a much more rapid rate.

---

This is a continuation of Ser. No. 446,233 filed Apr. 7, 1965, now abandoned.

This invention relates to material handling, and more in particular to methods and apparatus for rearranging the geometrical relationship between materials or items, such as bakery products.

An object of this invention is to provide for the handling of products, such as, doughnuts, cup cakes, pastry dough items and the like, during a production or conveying operation so that the items are delivered in a predetermined relationship. Another object is to provide methods and apparatus for changing the relative positions or arrangement between items which are to be conveyed or processed so that they move in another order or a different number of rows abreast. A further object is to provide for the above in a manner to change from a single or multiple row movement of items to another number of rows abreast or in a single row or in a different relationship. A further object is to provide methods and apparatus for receiving items as they are produced and for depositing them in an efficient and dependable manner for further conveying or processing. A further object is to provide for the above with methods and apparatus which are efficient, dependable, versatile and free of difficulties which have been encountered with similar apparatus in the past. These and other objects will be in part obvious and in part pointed out below.

In the drawings:

FIGURES 4 and 5 are diagrammatic cross-sectional views, taken along line 4—4 of FIGURE 2, and showing two stages of the operation of the apparatus;

FIGURE 6 is a schematic representation of the compressed air system of the embodiment shown in FIGURES 1 to 5, and the electrical system for controlling the air;

FIGURES 7 to 10 are diagrammatic plan views, somewhat similar to FIGURE 2 and illustrating some of the many uses to which this embodiment may be put;

FIGURE 11 is a diagrammatic plan view of another embodiment of the invention; and, FIGURE 12 is a diagrammatic plan view of another embodiment of the invention, with portions cut away.

The embodiment of the invention shown in FIGURES 1 to 5 is an apparatus for transferring articles to an outgoing or discharge conveyor that is approximately at right angles to the incoming or feed conveyor. The invention includes means for respacing and rearranging the articles in the course of the transfer. In illustrating this embodiment, the operation of a transfer apparatus will first be described with respect to a particular arrangement of the articles. Then, means for adjusting the apparatus of this embodiment for other arrangements of the articles will be explained, and other illustrative arrangements will be presented.

For the embodiment shown in FIGURES 1 to 10, it will be assumed first that the articles (see FIGURE 2) entering the transfer apparatus are arranged three abreast on the feed conveyor, the three articles in each row being evenly spaced and aligned, longitudinally of and perpendicular to the direction of travel. It will also be assumed that the articles on the transverse discharge conveyor are to be arranged in regularly spaced transverse rows of six and are aligned with one another in the direction of travel. Furthermore, the longitudinal spacing (between the transverse rows) on the discharge conveyor is to be the same as the transverse spacing of the articles on the feed conveyor, and the transverse spacing of the articles on the discharge conveyor is the same as the longitudinal spacing on the feed conveyor.

Figure 1:
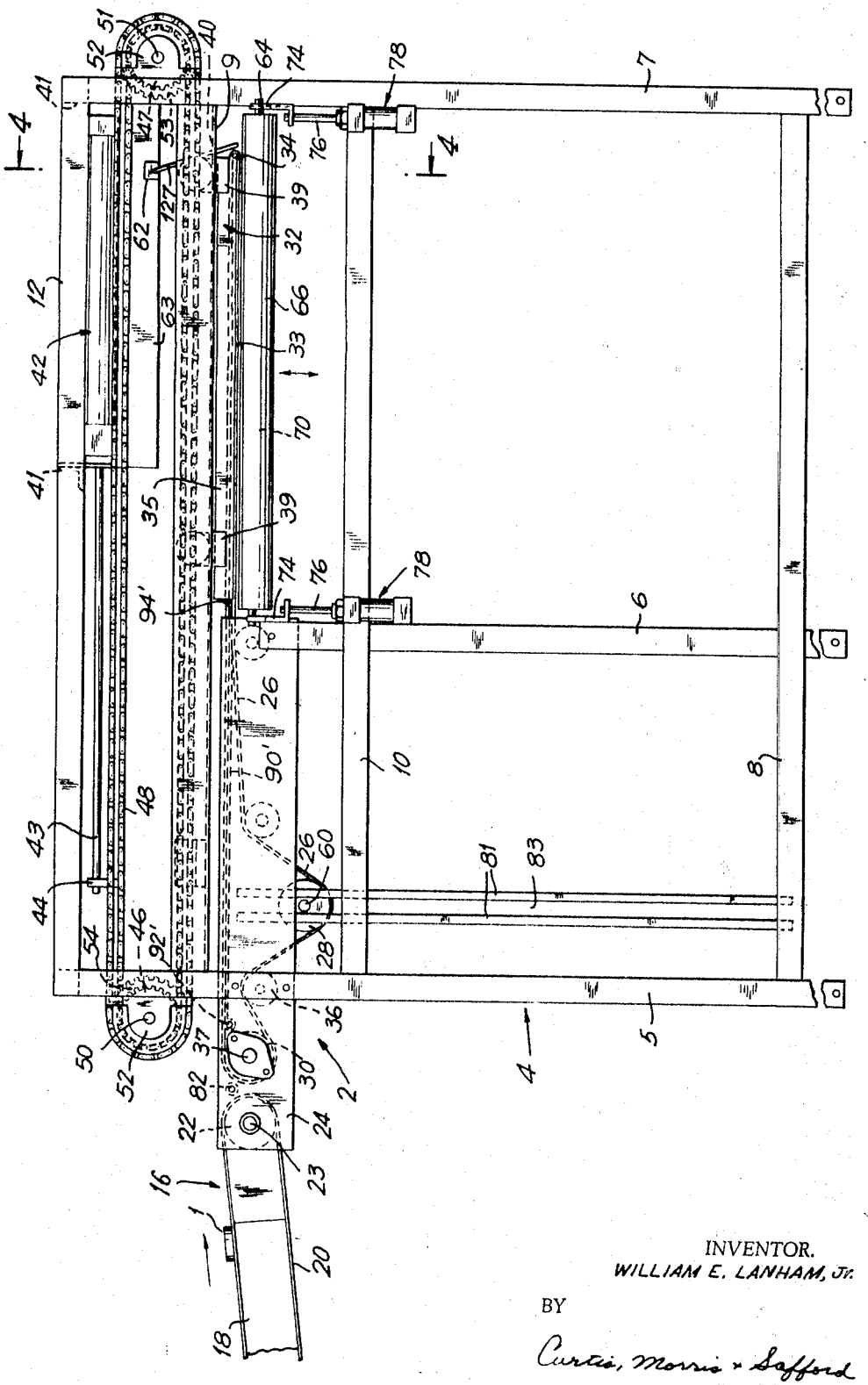
FIGURE 1 is a side elevation of one embodiment of the invention, with portions of the side walls of the apparatus broken away.

Referring to FIGURE 1, a transfer apparatus 2 is supported by a metal frame 4, which includes vertical frame members 5, 6 and 7, horizontal frame members 8, 9 and 10, and 12, and side panels 14, the near one of which is cut away to reveal portions of the apparatus.

Articles 1 are delivered to transfer apparatus 2 by an incoming feed conveyor 16, comprising a frame 18, a flexible endless conveyor belt 20, a pair of rollers 22 (one of which is shown) about which belt 20 turns, shafts 23 on which rollers 22 are mounted, and an electric motor drive means (not shown) for continuously driving belt 20 at a predetermined rate. Feed conveyor 16 is attached to transfer apparatus 2 by a pair of pivot plates 24 adjacent the inner sides of side panels 14, and attached to the sides of feed conveyor frame 18. Both the side panels and the pivot plates have bearing for the ends of shaft 23. Shaft 23 provides a pivotal connection of the feed conveyor to the transfer apparatus, allowing the height of the other end of the feed conveyor to be adjusted as necessary.

Articles 1 move along the feed conveyor in the direction of the arrow and enter the transfer apparatus. Adjacent the discharge end of feed conveyor 16 is the receiving end of a transfer conveyor 25, which moves at a continuous rate in the same direction as the feed conveyor. A roller 82, mounted in side plates 14 between the two belts, is driven at a suitable rate to aid the movement of articles to the transfer conveyor. To maintain the same longitudinal spacing of the articles on the transfer conveyor as on the feed conveyor, conveyor belts 20 and 26 are run at the same rate. Transfer conveyor 25 comprises an endless flexible belt 26, which passes around a movable weighted idler roller 28, a driving roller 30, and a horizontal metal plate 33 which forms the bottom of a tray 32. Belt 26 slides along the top of plate 33, passes around or turns on a small idler roller 34, rotatably mounted along one edge of plate 33, and moves along the bottom. The positioning of belt 26 is aided by idler rollers 36, which contact it on its outer surface. Idler rollers 36 and driving roller 30, are rotatably mounted upon side panels 14. Driving roller 30 is mounted upon a shaft 37, which is turned at a predetermined rate by an electric motor drive assembly (not shown), imparting a continuous rate of motion to belt 26. During operation the incoming materials, e.g., articles 1, pass from conveyor 16 over roller 82 to the top run of conveyor belt 26 with a continuous movement.

As will be explained more fully below, the action of tray 32 is to support the upper run of belt 26 and to move with it to the right through a material discharge zone. The tray then moves to the left with its right-hand edge passing back over the discharge zone, during which time the right-hand end of the upper rim of the belt passes around the right-hand edge of the tray, thus discharging the materials, e.g., articles 1. During each cycle of this operation the length of the upper run of belt 26 is increased and decreased by an amount equal to the width of the material discharge zone, all as will be explained more fully below.

Figure 2:
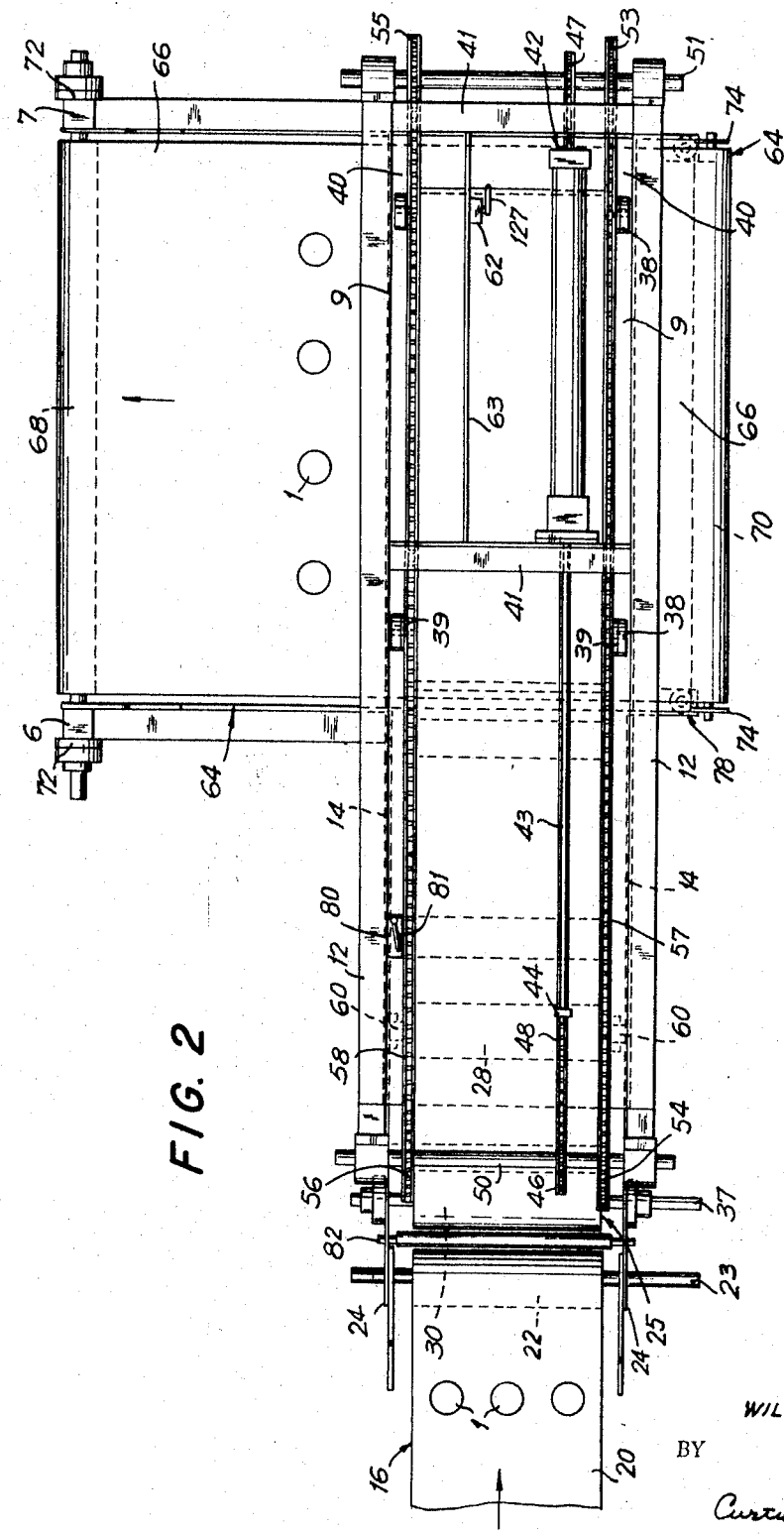
FIGURE 2 is a plan view of the apparatus of FIGURE 1.
Figure 3:
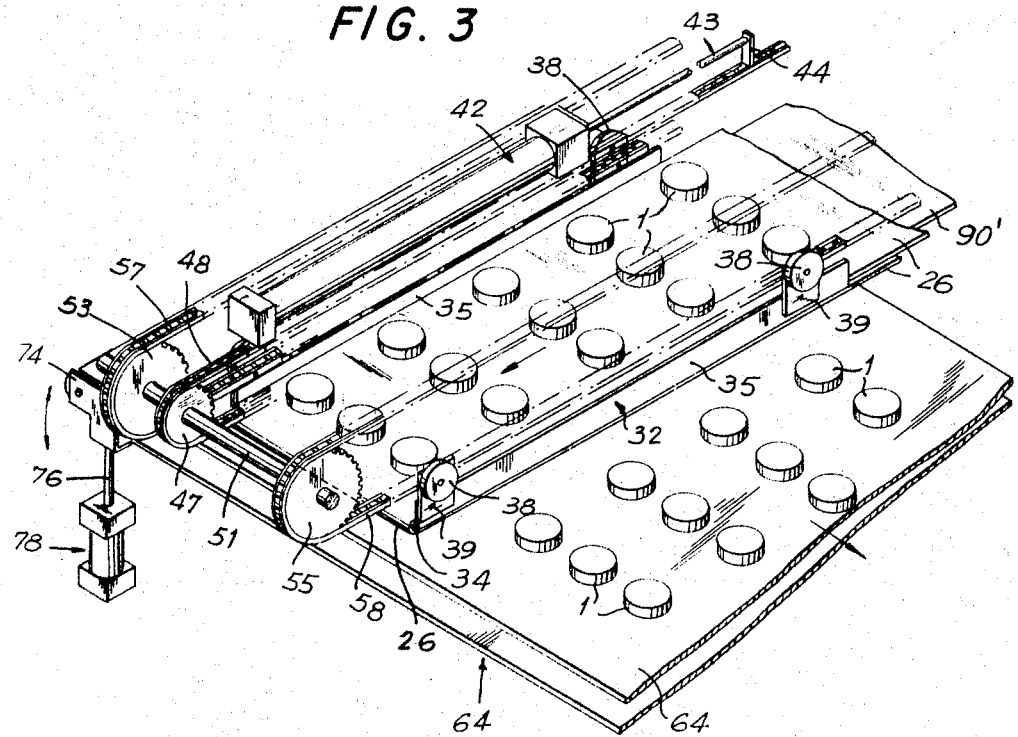
FIGURE 3 is a perspective view of portions of the apparatus of FIGURES 1 and 2, including the two conveyor belts and the transfer tray, together with certain of its supporting means.
Figure 4:
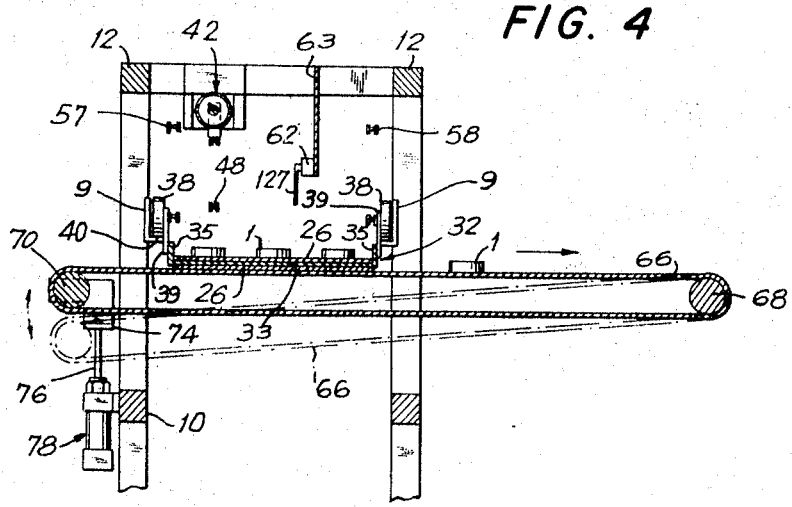

The means by which tray 32 is supported can be best understood by reference to FIGURES 1 to 3. Forming the sides of tray 32 are a pair of side members 35, which are clear of the area of contact between bottom plate 33 and belt 26, and which extend upwardly from the side edges of plate 33. Two support members 39 are attached to each of side members 35, and a small wheel 38 is rotatably mounted along the outside of each of support members 39, near its upper end. Wheels 38 rest upon the surfaces 40 of the horizontal portions of the two L-shaped horizontal frame members 9, which are attached to vertical frame members 5 and 7, parallel to belt 26. Thus, tray 32 is supported on wheels 38, through support members 39. Since wheels 38 are rotatably mounted on support members 39, the tray is free to move parallel to belt 26, with the wheels rolling along surfaces 40. Motion of tray 32 in this manner is controlled by a double-acting air cylinder unit 42 which has a piston rod 43 attached to a piston (not shown) which moves back and forth within the cylinder. Each end of the cylinder of unit 42 is connected to a supply of compressed air in a manner hereinafter to be described, to permit accurate adjustment of the rate of motion of the piston in either direction. Air cylinder unit 42 is mounted on support members 41, attached to frame members 12. An extension 44 of the piston rod 43 of air cylinder unit 42 is attached to an endless chain 48. Chain 48 turns on a pair of sprocket wheels 46 and 47, rigidly mounted on shafts 50 and 51 respectively, which are rotatably attached to vertical frame members 5 and 7 by brackets 52.

Also fixed on shaft 50 to rotate with sprocket wheel 46 are two sprocket wheels 54 and 56. Similarly, a pair of sprocket wheels 53 and 55 is attached to shaft 51 so that wheels 53 and 55 will turn with sprocket wheel 47. The wheels 53, 54, 55 and 56 are positioned near the ends of their respective shafts in such a way that wheel 53 is in alignment with wheel 54 and wheel 55 with wheel 56. Passing between each pair of aligned wheels is a chain which is engaged by the sprockets of each of the wheels. Wheels 53 and 54 carry chain 57 and wheels 55 and 56 carry chain 58. The ends of chains 57 and 58 are attached to support members 39 of tray 32.

Thus, motion from the piston of air cylinder unit 42 is transmitted to the tray 32 through the system including chain 48, wheels 46 and 47, shafts 50 and 51, wheels 53, 54, 55 and 56, and support members 39.

Extending from each end of the weighted idler roller 28 is a stub shaft 60. A pair of parallel vertical metal strips 81, is attached to frame members 8 and 10 adjacent each end of roller 28. The distance between each pair of strips is slightly greater than the diameter of stub shaft 60 and are adapted to receive the shaft. Thus, the strips 81 provide a pair of tracks for idler roller 28, allowing it free vertical motion. The function of the movable idler roller is to compensate for changes in the position of belt 26 caused by the motion of the tray 32, thus to maintain the belt 26 taut throughout its entire length at all times. The roller is weighted so that it is heavy enough to take up immediately any slack in the belt produced by the motion of the tray 32 to the left. However, it must be light enough so that it will not have any appreciable effect upon the rate at which roller 30 drives belt 26, even when the tray 32 is moving to the right and causing the roller 28 to move upward.

Positioned immediately beneath tray 32 (see FIGURES 1, 2 and 4) there is a discharge or outgoing belt conveyor 64 which is adapted to receive articles 1 from the upper run of belt 26 and to move them along a transverse discharge path, toward the top of FIGURE 2. Conveyor belt 64 has an endless flexible belt 66 supported by a driving roller 68 and an idler roller 70. Driving roller 68 is supported at its ends by a pair of brackets 72 attached to vertical frame members 6 and 7, and the roller is driven through its shaft by a motor-drive unit (not shown).

Idler roller 70 is rotatably mounted at its ends in a pair of brackets 74, each of which is mounted upon and supported by a piston rod 76 of an air cylinder unit 78. Air cylinder units 78 are mounted upon horizontal frame member 10, and air is supplied to them, as will be explained below, so as to move idler roller 70 vertically between the full-line and broken-line positions of FIGURE 4. Thus, when the piston rods 76 are extended, the upper run of belt 66 is positioned immediately below the bottom run of belt 26 which, in turn, is directly beneath the bottom of tray 32. However, when the piston rods are withdrawn downwardly into the cylinders, roller 70 and the left-hand end of belt 66 are moved downwardly to the broken-line position so that the upper run of belt 66 is spaced a predetermined distance below the plane of the bottom run of belt 26. However, roller 68 does not change its position so that the discharge end of belt 66 remains at the same level at all times.

During each cycle of operation, when the articles are being discharged onto belt 66, air is supplied to air cylinder units 78 to raise roller 70 and the left-hand end of the belt to the full-line position. At the end of each such discharge operation, piston rods 76 carry roller 70 downwardly so that belt 66 is in the broken-line position during the time that tray 32 is moving back from left to right (FIGURES 1 and 2).

Under some circumstances, it may be difficult to insure that weighted roller 28 will exert enough force on belt 26 to prevent the belt from sagging between driving roller 28 and the trailing edge 35' of tray 32, when tray 32 has moved to the extended-belt position over the discharge area. This can interfere with the smooth return of the tray. To avoid this problem, a thin rectangular metal plate 90' supports belt 26 throughout this area (see FIGURE 1). The edge of plate 90' is bent downwardly to form an integrel cylindrical pivot sleeve, enclosing a cylindrical support rod 92'. Rod 92' is mounted between side panels 14 and attached to each of them. At the opposite (right-hand) end, plate 90' extends at 94' above and rests upon the trailing end of tray bottom 33. When the tray is in the far right position of FIGURE 1, the distance of overlap between the edges 94' and 35 is very slight. However, as the tray moves to the left, the extent of its overlap increases, until at the far left position, plate 90' covers almost the entire length of the tray bottom.

FIGURE 6 is a diagram illustrating the system that controls the action of the air cylinders. The operation of cylinder units 42 and 78 has been previously referred to and is under the control of switches 62 and 80. A source of compressed air 90, supplies air at a constant pressure through a pipe 92 to a pair of slide valves 94 and 120. Valve 94 comprises a cylindrical casing 96 and a slide 98, with enlarged end portions 100 and 102, each of which forms a seal with the adjacent wall of cylinder 96. Located in the chamber between the end portions is a center portion 104 which holds the end portions in a fixed position with respect to one another. Center portion 104 is small enough so that it does not interfere with the passage of air through the chamber. Slide 98 can be moved to either end of cylindrical casing 96.

Pipe 92 is connected to cylinder 96 at its center and is always in communication with the chamber 105 between end portions 100 and 102. Cylinder 96 has outlet pipes 108 and 110, each of which communicates with one end of cylinder 42. When the valve is in the position shown in the drawing, compressed air supplied through pipe 92 passes through the valve chamber 105 and pipe 108 to one end of cylinder 42. At the same time, air is permitted to escape from the other end of cylinder 42 through pipe 110 and out the open end of cylinder 96. When slide 98 moves to the other end of the casing, pipe 110 communicates with the compressed air line and pipe 108 with an open end of the casing, causing air to be supplied to the right-hand end of cylinder 42 to move the piston in the opposite direction. The position of the slide 98 is controlled by a pair of solenoids 112 and 114, either of which draws the slide toward it when it is energized. Solenoid 112 is connected across power lines 116 and 118 by switch 62, and, solenoid 114 by switch 80. The rate of motion of the piston in air cylinder 42 is controlled by a pair of regulating valves 109 and 111 located in pipes 108 and 110, respectively.

Slide valve 120 which controls cylinder unit 78, operates in exactly the same manner as valve 92, except that outlet pipes 122 and 124 are not provided with regulating valves and each of them branches to connect with both of the cylinder units 78. The action of the valve slide is controlled by solenoid 126, energized by switch 62, and solenoid 128, energized by switch 80.

Referring again to FIGURES 1 and 2, as tray 32 reaches the full-line position, arm 127 of switch 62 is engaged by the edge of belt 26 on the tray carriage so as to close the switch. Similarly, when the tray returns to the left-hand position of FIGURE 5, arm 81 of switch 80 is engaged and the switch closed. Hence, the cycle involves the movement of the tray to the right until switch 62 is closed; that reverses the movement of the tray and raises the pistons in cyilnder units 78 so as to lift roll 70 and belt 66. The tray then moves back across the discharge zone so as to discharge the materials from belt 26; switch 80 is then closed so as to reverse the movement of the tray and simulaneously lower belt 66.

At the start of each discharge cycle for discharging materials from belt 26, (see FIGURE 5), tray 32 is in the extended belt or far left position, and articles 1 have advanced from feed conveyor 16 until the foremost of them is approaching roller 34. Air is then supplied to the right-hand side of air cylinder 42, driving the piston to the left at a controlled rate such that it moves tray 32 to the right at a speed that is equal to that at which driving roller 30 is moving belt 26. Thus, during the period that the tray 32 is moving to the right, the upper horizontal portion or run of belt 26 rests upon the tray in fixed relationship thereto and the belt continues to move at the same speed with respect to the fixed frame of the transfer apparatus, and the articles 1 on belt 26 do not move toward roller 34. The weighted idler roller, which is at its lowest point at the beginning of the cycle, moves upward to account for the motion of the tray 32 and roller 34 to the right, feeding belt to the left as it is required by he driving roller 30 and feeding it to the right at the necessary rate, responding directly to the tension exerted by the motion of roller 34.

When the tray 32 reaches the far right position, it remains there while roller 30 continues to drive belt 26, until either the belt edge or the foremost of articles 1, approaching roller 34, engages arm 127 and trips switch 62 (see FIGURE 1). Arm 127 is adjustably suspended above the end of the belt at this point by a support 63, attached to supports 39 and 41. This causes compressed air to fill the left-hand end of the air cylinder 96, releases the air from the right-hand end, forces the piston to the left and returns the tray 32 to its starting position. During the return of tray 32, the idler roller 28 continues to feed belt 26 to driving roller 30 at the usual rate. However, it receives the belt at a greater rate, equal to the sum of the rate of roller 30 and the rate of the return of tray 32, so that roller 28 again moves down to take up the slack, resuming the position on FIGURE 5.

Belt 26 and the material or articles upon it continue to be moved toward roller 34 by driving roller 30. As already explained, the action of weighted idler roller 28 adds to this the rate of motion of tray 32. Thus, both the inertia of articles 1 and the friction of belt 26 against them prevents the articles from following the return motion of tray 32, and causes them to move or drop over the edge of belt 26 formed by roller 34 as it passes them. FIGURE 6 shows the position of belt 26, tray 32, and articles 1 at one point during the course of the return.

The return of the tray 32 is accomplished at a very rapid rate, so that the distance traveled by belt 26 as a result of driving roller 30 during the period of the return of tray 32 is relatively small. Thus, when each article 1 drops over the retracting edge at roller 34, it occupies substantially the same position with respect to the others that it occupied on belt 26 at the beginning of the return or discharge movement.

The tripping of switch 62 to begin the return also causes the compressor to fill air cylinders 78, raising conveyor 64 to the position shown in FIGURE 1. As each of objects 1 drops over the edge 34, it is positioned on belt 66 after a very short drop, being only the thickness of the small roller 34 and two layers of belt 26, in addition to a slight clearance between belts 26 and 66.

Also, it has been mentioned that the discharge conveyor 64 is in continuous motion. This, however, is at a very slow rate when compared to the rapid return rate, so that belt 66 moves very little between the drop of the first and the last of articles 1 during return. Thus, because the return speed of tray 32 is very rapid compared to the speed of either of the belts, articles 1 assume substantially the same positions on transverse belt 64 that they occupied on belt 26 at the beginning of the return tray movement, and they begin their transverse motion on conveyor 66 at substantially the same time.

Roller 70 remains in the raised position only until the completion of the return of the tray, when one of supporting members 39 trips switch 80 activating the air cylinders 78 to lower roller 70, thus increasing the clearance between belts 26 and 64 when the tray 32 again moves to the right. That clearance permits relatively high articles to be handled without being engaged by the bottom run of belt 26 as the articles are moved slowly along discharge conveyor 64, and tray 32 is progressing downwardly again carrying the forward end of belt 26.

When tray 32 reaches its original position (see also FIGURE 3), the regularly spaced row of articles immediately following the last row dropped over the edge formed by the roller 34 is positioned near roller 34. Since driving roller 30 has maintained the continuous rate of motion of the portion of the belt between itself and roller 34, the portion of the belt over tray 32 is filled with articles regularly spaced as before. Thus, the motion of tray 32 to the right with belt 26 is begun immediately upon the completion of the return movement of tray 32. This step, like the lowering of roller 70, is initiated by the tripping of switch 80.

The next cycle continues exactly as before, the roller 70 remaining in its lowered position to provide clearance between the two conveyors, and preventing belt 26 and tray 32 from interfering with the articles already deposited on belt 66. By the time tray 32 reaches the far right-hand position, transverse conveyor 64 has moved sufficiently to remove all the objects from beneath the tray and belt 26 allowing conveyor 64 to be raised to receive another group of articles during the next return and discharge movement. It is essential that belt 66 move at a rate that is rapid enough to remove all the articles from beneath tray 32 before the beginning of the return. Furthermore, to maintain regular spacing between the transverse rows on discharge conveyor 64, belt 66 should be driven at a rate such that there is the desired spacing between the last row on the discharge conveyor and the next adjacent parallel row which is being discharged from belt 26. Illustratively, this spacing is the same as the transverse spacing between the longitudinal rows of articles on belt 26. Hence, when three rows of articles are being received on belt 26 (FIGURE 3) and the articles are being discharged in four rows, each group of twelve articles is spaced from the next group the same as the spacing between the transverse rows on belt 66.

Thus far, the arrangements of the articles on the feed and discharge conveyors shown in FIGURES 2 and 3 have been described to illustrate the operation of the embodiment of the invention. It will be understood that in this embodiment the manner in which the articles received from the feed conveyor are rearranged on the discharge conveyor can be controlled by adjusting the speeds of the three belts 20, 26 and 66. Each of the drawings 7 to 11 is a diagrammatic plan view showing articles 1 as they are arranged on belts 20, 26, and 66 at the start of the return or discharge movement, illustrating a different manner of rearranging the articles as they are transferred from the feed conveyor to the discharge conveyor.

In FIGURE 8, the articles on the feed conveyor are arranged as they are in FIGURE 2. It is desired, however, that the spacing between the articles of each transverse row on discharge belt 66 be increased. For this purpose, transfer belt 26 is run at a greater rate than feed belt 20 of incoming feed conveyor 16.

In FIGURE 9, the spacing between the transverse rows of articles is far greater than in FIGURES 2 and 3. To arrange them in the manner of the articles on the incoming feed conveyor 16 in FIGURE 8, transfer belt 26 is run at a slower rate than the feed belt 20.

FIGURE 10 illustrates the reduction of the spacing between articles moving in a single file on feed belt 20 by running transfer belt 26 at a slower speed than belt 20, and the conversion of the single file into a series of rows of articles.

FIGURE 11 illustrates a situation in which both the longitudinal and transverse spacing is increased as the articles pass through the transfer apparatus. To accomplish this, the feed conveyor comprises a plurality of belts, moving adjacent to one another and at the same rate, with each belt carrying one longitudinal row of articles. These belts separate as they approach the transfer belt 26 to the extent necessary to give the desired transverse spacing on belt 26. Furthermore, the transfer belt is run at a greater rate than the feed belts, so that the longitudinal spacing is increased as well.

It is to be understood that the examples presented in FIGURES 8 through 11 and in FIGURE 1 are intended merely to be illustrative of certain of the methods that may be used in connection with the embodiment disclosed to change the arrangement and spacing of the articles as they pass through the transfer apparatus. Furthermore, the use of a regular, rectangular arrangement has been for the purpose of illustration, and it is contemplated that the apparatus disclosed can be used to transfer, either with or without rearrangement or respacing articles in other arrangements including those which are irregular and random.

It has been pointed out that the ratio of the rate of the discharge conveyor to the rate of the return is so slight that the articles deposited on the discharge belt are in substantially the same alignment as they were on the transfer conveyor. However, since the discharge conveyor moves some distance during the return or discharge movement of tray 32, there is a deflection of the rows on the discharge conveyor, so that they are at a slight angle to a line transverse of the discharge belt. Although this angular placement of the rows can often be ignored, there may be circumstances in which it is not practical to run the transfer apparatus and discharge conveyor at the relative speeds required. For example, articles may be fed to the transfer apparatus (and discharged from it) at such a rapid rate that it is not practical to increase the rate of the return sufficiently to reduce the angle of deflection to a few degress. A similar problem might arise when it is necessary to position the articles on the discharge belt with great accuracy.

FIGURE 12 is a diagrammatic plan view illustrating this problem and an embodiment of the invention designed to solve the problem. Transfer conveyor 130 is shown at the end of its return or discharge movement across the discharge belt 132. Instead of being at right angles to the transfer conveyor as in the embodiments previously described, the discharge conveyor is at an acute angle to it. Thus, the angle of the conveyors to one another tends to offset the amount of deflection due to the motion of the discharge conveyor during each discharge operation, and with proper adjustment of the conveyor and return speeds, articles 1 can be arranged in rows that are transverse to the direction of travel of the discharge conveyor. Thus, the accuracy of the transverse alignment of the rows does not depend upon the extent to which the return speed can be increased and the discharge belt speed decreased, but merely upon the accuracy with which these factors and values can be adjusted. The angle between the two conveyors should be selected so that the belts and tray return mechanism can be operated and adjusted with convenient ranges of speed.

Under some circumstances, the products being handled are such that very satisfactory results may be obtained by discharging the product onto a surface which is not moved vertically. Hence, it may be unnecessary to move roller 70 and conveyor belt 66 up and down as described above. Also, means may be provided to direct the outer edge of conveyor 26 downwardly at an angle. The materials being conveyed may also be delivered to trays or pans which are moved in the same way in which conveyor 64 moves the product.

The invention also provides transfer means for depositing articles upon trays, into packages, or onto other endless conveyors, particularly conveyors moving in a direction other than that of the motion of the transfer means. The articles discharged from the conveyor may be arranged and spaced in a predetermined manner, and at a constant or variable rate, depending upon the adjustment of the apparatus and the arrangement of the articles as they are fed to the transfer device.

An important advantage of the transfer apparatus of the present invention is its ability to handle very fragile articles without damage. Unlike some previous automatic transfer devices, it moves the objects in a smooth regular manner throughout the operation, the only sudden movement being the very slight drop over edge 34. The apparatus subjects the articles neither to the frictional effects of sliding nor to the strain, for example, of being lifted by a device pressing upon their sides. Furthermore, one of the principal problems of many such devices, that of preventing unstable objects, such as cupcakes, from tipping over, is satisfactorily solved.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

I claim:
1. In aparatus of the type which is adapted to handle articles, the combination of, an endless conveyor belt having a conveyor run which is adapted to receive articles at a receiving zone and to discharge the articles at a transfer zone, means for driving said conveyor belt at a first controlled rate, guide means around which said belt extends at the terminal edge of said transfer zone, reciprocating power means operatively associated with said guide means thereby to move said guide means across said transfer zone alternately, said power means having a normal operating cycle comprising a constant-speed advance stroke and a constant-speed return stroke, said power means including means to vary the speed of said advance stroke independently of the speed of said return stroke, said power means being actuable to move said guide means on said advance stroke in the direction of movement of the belt at said first controlled rate and thence on said return stroke in the opposite direction at a second controlled rate which is independent of and greater than said first controlled rate whereby said terminal edge moves across said transfer zone with said belt at said first controlled rate and then moves back across said transfer zone opposite to the direction of movement of said belt at said second controlled rate, take-up means positioned in the return run of said belt and adapted to alternately increase and decrease the length of the return run of said belt to maintain said belt in contact with said guide means, a discharge means positioned beneath the level of said guide means throughout said transfer zone and adapted to receive articles discharged from said belt and to move the articles along a guide path which is substantially transverse to the general path of said belt, said discharge means including adjustment means operatively associated with said power means to raise said discharge means from a first lower position spaced from the lower run of said conveyor belt to a second higher position subjacent said lower run of said conveyor belt when said power means is actuated on said return stroke.

2. Apparatus as described in claim 1 wherein said endless conveyor is an endless flexible belt and wherein said take-up means comprises a take-up roller around which the return run of said belt extends and roller mounting means for said take-up roller, said roller mounting means comprising a pair of tracks which extend vertically and journals upon the ends of said take-up roller and positioned to move vertically in said tracks, said roller being gravity urged and freely movable downwardly, thereby to exert a constant pulling force upon the return run of said belt of sufficient magnitude to draw said belt from said guide means during the movement of said guide means in said opposite direction, and thereafter upwardly to permit said guide means to move in the direction of the conveying movement of said belt.

3. Apparatus as described in claim 1 wherein said drive means includes a driving roller for said belt positioned between said take-up means and said receiving zone.

4. Apparatus as described in claim 3 which includes roller means including a roller positioned beneath the return run of said belt between said guide means and said take-up means, said roller means guiding said belt along substantially parallel lines adjacent said guide means.

5. Apparatus as described in claim 1 which includes telescoping rigid support means providing a continuous support surface throughout said conveyor run of said conveyor belt, and comprising a movable tray adjacent said guide means and providing support therefor.

6. Apparatus as described in claim 5 which includes support means for said tray comprising means forming a pair of parallel tracks and rollers mounted upon said tray and riding on said tracks.

7. Apparatus as described in claim 1 wherein said power means for moving said guide means includes a cylinder and piston unit which is adapted to produce controlled alternate movements of the piston within the cylinder, a sprocket wheel and chain assembly mechanically connecting said unit to said guide means, and control means to provide for separate control of the rates of movement in the two directions.

8. Apparatus as described in claim 7 which includes an electric circuit means for controlling said unit and having a pair of electric switches which are operated mechanically by the respective arrival of said guide means to the opposite edges of said transfer zone.

9. Apparatus as described in claim 1 wherein said guide means comprises a relatively small roller around which said belt extends and means rigidly mounting said roller and presenting a substantially semi-cylindrical surface which is contacted by said belt.

References Cited

UNITED STATES PATENTS

| 509,976 | 12/1893 | Van Stavoren. |
|---|---|---|
| 2,588,283 | 3/1952 | Osgood. |
| 2,633,977 | 4/1953 | McMillan. |
| 3,106,280 | 10/1963 | Baker. |
| 3,150,761 | 9/1964 | Pinault et al. |

FOREIGN PATENTS 392,947    3/1924    Germany.

RICHARD E. AEGERTER, Primary Examiner

U.S. Cl. X.R.

198—102, 139